(12) United States Patent
Lowe

(10) Patent No.: US 6,957,990 B2
(45) Date of Patent: Oct. 25, 2005

(54) ELECTRIC HOUSEBOAT

(76) Inventor: Jerry W. Lowe, R.R. 2 Box 132, Albany, KY (US) 42602

( * ) Notice: Subject to any disclaimer, the term of this patent is extended or adjusted under 35 U.S.C. 154(b) by 0 days.

(21) Appl. No.: 10/967,561

(22) Filed: Oct. 18, 2004

(65) Prior Publication Data

US 2005/0064768 A1 Mar. 24, 2005

Related U.S. Application Data

(63) Continuation of application No. 10/226,036, filed on Aug. 21, 2002, now abandoned.

(51) Int. Cl.$^7$ .......................... B63H 21/17; B63B 29/02
(52) U.S. Cl. ............................. 440/6; 114/71; 114/189
(58) Field of Search ...................... 440/3, 4, 6, 88 HE; 114/60, 65 R, 66, 70, 71, 144 R, 144 RE, 144 A, 144 E, 189, 382

(56) References Cited

U.S. PATENT DOCUMENTS

| 1,618,827 | A | * | 2/1927 | Jewitt | .......................... 318/144 |
| 1,717,255 | A | * | 6/1929 | Pollock | ....................... 318/142 |
| 1,788,264 | A | * | 1/1931 | Wilson | ...................... 114/77 R |

(Continued)

FOREIGN PATENT DOCUMENTS

| CH | 625754 | 10/1981 | |
| DE | 1227360 | 10/1966 | |
| DE | 2228772 | 1/1974 | |
| DE | 2237400 | 2/1974 | |
| DE | 3402015 | 7/1985 | |
| DE | 3836259 | 4/1990 | |
| DE | 4105318 | 8/1992 | |
| DE | 4205398 A1 | * | 9/1993 | ............. B63B/3/16 |
| DE | 4230497 | 3/1994 | |
| EP | 257385 | 3/1988 | |
| EP | 1013544 A2 | * | 6/2000 | ........... B63H/25/42 |
| FR | 1136484 | 3/1959 | |
| FR | 2306870 | 12/1976 | |
| GB | 212939 A | * | 11/1924 | ........... B63H/23/24 |
| GB | 263276 A | * | 12/1926 | ........... B63H/23/24 |
| GB | 425293 A | * | 2/1935 | ........... B63H/25/38 |
| GB | 435850 A | * | 9/1935 | ........... B63H/25/38 |
| GB | 465901 A | * | 5/1937 | ........... B63H/25/38 |
| GB | 891701 A | * | 3/1962 | ........... B63H/25/38 |
| GB | 0954810 | 4/1964 | |
| GB | 2084098 | 4/1982 | |
| GB | 2170664 | 8/1986 | |
| JP | 54087339 A | * | 7/1979 | ........... F01B/23/00 |
| JP | 02262495 | 10/1990 | |
| JP | 04038293 | 2/1992 | |
| JP | 04200296 A | * | 7/1992 | ........... H02P/7/632 |
| JP | 06270891 | 9/1994 | |
| JP | 09039894 A | * | 2/1997 | ........... B63H/25/38 |
| JP | 09086496 A | * | 3/1997 | ........... B63H/25/38 |
| JP | 10089015 | 4/1998 | |
| JP | 2002/137795 | 5/2002 | |
| JP | 2002234494 | 8/2002 | |
| JP | 2002234495 | 8/2002 | |

(Continued)

OTHER PUBLICATIONS

Compilation of English Abstracts for foreign references submitted by the applicant.*

Primary Examiner—S. Joseph Morano
Assistant Examiner—Ajay Vasudeva
(74) Attorney, Agent, or Firm—Michael A. O'Neil

(57) ABSTRACT

An electric houseboat comprises a hull and a house-like structure mounted on the hull which includes at least one bedroom, a bathroom, and a kitchen. A Diesel generator comprises the sole power source for the houseboat. The operating temperature of the Diesel generator is controlled by directing coolant through the Diesel generator and through a keel pipe which extends along the hull of the houseboat thereby discharging heat into the water over which the houseboat operates. Exhaust resulting from operation of the Diesel generator is directed upwardly and is discharged at a point substantially above the water and above the house-like structure of the houseboat.

27 Claims, 5 Drawing Sheets

U.S. PATENT DOCUMENTS

| | | | |
|---|---|---|---|
| 2,009,576 A * | 7/1935 | Coates | 318/55 |
| D134,903 S * | 1/1943 | Gross | D12/315 |
| D145,451 S * | 8/1946 | Leavitt | D12/318 |
| D149,667 S * | 5/1948 | O'Connor | D12/315 |
| 2,451,936 A * | 10/1948 | Frisch | 318/147 |
| 2,466,525 A * | 4/1949 | Wilson | 165/282 |
| 2,589,894 A * | 3/1952 | Ten Eyck | 296/168 |
| 3,651,779 A | 3/1972 | Norton | 115/35 |
| 3,731,644 A | 5/1973 | Bradt | 114/61 |
| 4,066,032 A | 1/1978 | Travis | 115/18 |
| 4,114,555 A | 9/1978 | O'Brien, Jr. | 115/76 |
| 4,294,186 A | 10/1981 | Wardell | 114/151 |
| 4,417,878 A | 11/1983 | Koren | 440/3 |
| 4,528,928 A * | 7/1985 | Virta et al. | 114/189 |
| 4,532,877 A | 8/1985 | Nagata et al. | 114/144 |
| 4,661,714 A | 4/1987 | Satterthwaite et al. | 290/4 |
| 4,691,659 A | 9/1987 | Ito et al. | 114/144 |
| 4,729,334 A * | 3/1988 | DeJean, Jr. | 114/255 |
| 4,869,194 A * | 9/1989 | Cummins | 114/344 |
| D307,129 S * | 4/1990 | Caouette | D12/315 |
| 4,946,411 A | 8/1990 | Novey | 440/84 |
| D334,376 S * | 3/1993 | McNeir | D12/315 |
| 5,199,912 A | 4/1993 | Dade et al. | 440/6 |
| 5,214,363 A | 5/1993 | Wisner et al. | 318/588 |
| 5,616,056 A | 4/1997 | Meissner | 440/3 |
| 5,684,690 A | 11/1997 | Levedahl | 363/178 |
| D387,325 S * | 12/1997 | Deveau | D12/315 |
| 5,732,644 A * | 3/1998 | Sell | 114/211 |
| 5,816,870 A | 10/1998 | Rubin | 440/6 |
| 5,863,228 A | 1/1999 | Tether | 440/6 |
| 6,132,267 A | 10/2000 | Campbell | 440/6 |
| 6,150,731 A | 11/2000 | Rinaldi et al. | 290/1 |
| 6,175,163 B1 | 1/2001 | Rinaldi et al. | 290/6 |
| 6,188,139 B1 | 2/2001 | Thaxton et al. | 290/4 |
| 6,223,669 B1 * | 5/2001 | Bowden | 114/65 R |
| 6,396,161 B1 | 5/2002 | Crecelius et al. | 290/36 |
| 6,511,354 B1 | 1/2003 | Gonring et al. | 440/87 |
| 6,538,217 B1 | 3/2003 | Eriksen et al. | 200/5 |
| 6,592,412 B1 | 7/2003 | Geil et al. | 440/6 |
| 6,645,017 B1 | 11/2003 | Skrzypek et al. | 440/6 |
| 6,782,841 B2 * | 8/2004 | Esposito | 114/366 |
| 6,848,382 B1 * | 2/2005 | Bekker | 114/144 B |

FOREIGN PATENT DOCUMENTS

| | | | | |
|---|---|---|---|---|
| RU | SU 1180303 | 9/1985 | | |
| RU | SU 1320120 | 6/1987 | | |
| RU | SU 1421615 | 9/1988 | | |
| RU | SU 1497110 | 7/1989 | | |
| RU | SU 1699862 | 12/1991 | | |
| SU | 657685 A * | 2/1980 | | B63H/21/10 |
| SU | 944989 B * | 7/1982 | | B60K/11/02 |
| SU | 1040197 A * | 9/1983 | | B63H/21/14 |
| WO | WO 94/14649 | 7/1994 | | |
| WO | WO 02/47974 | 6/2002 | | |
| WO | WO 03/006313 | 1/2003 | | |

\* cited by examiner

ELECTRIC HOUSEBOAT

CROSS-REFERENCE TO RELATED APPLICATIONS

This application is a continuation of application Ser. No. 10/226,036 filed Aug. 21, 2002 now abandoned, currently pending.

TECHNICAL FIELD

This invention relates generally to houseboats, and more particularly to an electric houseboat utilizing a Diesel generator as its sole power source.

BACKGROUND AND SUMMARY OF THE INVENTION

This application is a continuation of application Ser. No. 10/226,036 filed Aug. 21, 2002 now abandoned, the disclosure of which is incorporated herein by reference as if fully set forth herein.

As used herein the term houseboat means a hull adapted to float on and move across the surface of the body of water and a house-like structure mounted on the hull and including at least one bedroom, at least one bathroom, and a kitchen. In most instances the hull comprises a flat bottom hull, a V-bottom hull, or a pontoon-type hull. The houseboat further includes propulsion and steering devices whereby a movement of the houseboat across the surface of a body of water can be controlled. In most instances the houseboat is provided with a bridge comprising controls for the propulsion and steering devices as well as gauges and switches for monitoring and controlling various features and accessories of the houseboat.

Heretofore almost all houseboats have utilized carburation/ignition engines fueled by gasoline as the primary power source. In most instances two such engines are employed, one operatively connected to the propulsion device of the houseboat and the other operatively connected to a generator which provides electric power for the houseboat. In almost every instance the exhaust resulting from operation of houseboat engines has been discharged either directly into the water or through exhaust ports located close to the water line. Both of these alternatives are extremely dangerous because persons riding on and swimming near the houseboat are subject to carbon monoxide poisoning which, as is well known, causes serious illness and death.

The present invention comprises an electric houseboat which overcomes the foregoing and other problems which have long since characterized the prior art. In accordance with the broader aspects of the invention a houseboat is provided with a Diesel generator which comprises the sole power source for the houseboat. Electric power from the Diesel generator is directed to the propulsion and steering devices of the houseboat whereby the movement of the houseboat across a body of water is very precisely controlled. Electric power from the Diesel generator is also utilized to power all of the features and accessories of the houseboat, for example, lighting, appliances, air conditioning, etc.

As is well known, the exhaust generated by Diesel engines includes very little, if any, carbon monoxide. Thus, the use of a Diesel generator as the sole power source for the houseboat substantially eliminates the possibility that persons riding on or swimming around the houseboat will be subjected to carbon monoxide poisoning. As a further precaution, the exhaust from the Diesel generator is discharged through exhaust ports which are situated high above the water line and high above the decks and living quarters of the houseboat. In this manner the possibility of persons riding on or swimming around the houseboat coming into contact with the exhaust generated by operation of the Diesel generator is virtually eliminated.

In accordance with another feature of the invention, the operating temperature of the Diesel generator is regulated by circulating a coolant therethrough. Heated coolant from the Diesel generator is directed through a keel pipe secured to the bottom of the hull of the houseboat. In this manner heat generated by operation of the Diesel generator is discharged into the water body upon which the houseboat operates. The heated coolant is also directed through a heat exchanger which provides hot water for the kitchen and the bathroom(s) of the houseboat. Heated coolant may also be directed through a second heat exchanger which provides hot water for a hot tub mounted on the houseboat.

BRIEF DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
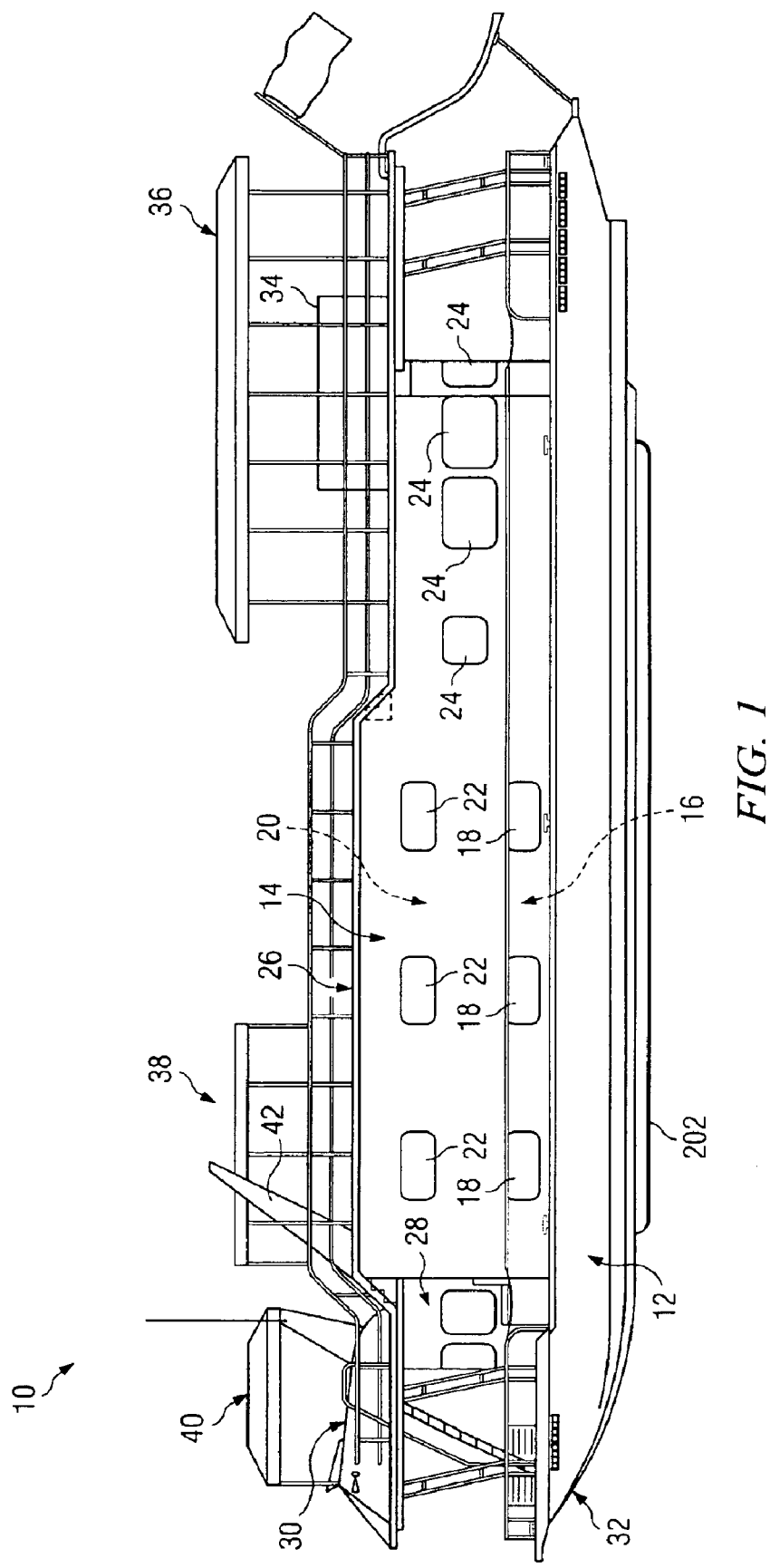
FIG. 1 is a port side view of the electric houseboat incorporating the invention.

Referring to the Drawings, and particularly to FIG. 1, there is shown an electric houseboat 10 incorporating the present invention. The electric houseboat 10 comprises a hull 12 which may comprise a flat bottom hull, a V-shaped hull, or a pontoon-type hull.

The electric houseboat 10 further comprises a house-like structure 14 mounted on the hull 12. The house-like structure 14 comprises a lower deck 16 characterized by windows 18, an upper deck 20 characterized by windows 22 and 24, and a generally open top deck 26. The upper deck 20 is provided with a bridge 28 and the top deck 26 is provided with a flying bridge 30. The bridge 28 and the flying bridge 30 are both located at the bow 32 of the electric houseboat 10. The bridge 28 and the flying bridge 30 comprise substantially duplicate sets of controls, gauges, and switches for regulating the operation of the electric houseboat 10 as it moves across the surface of a body of water.

The top deck 26 is substantially open to the atmosphere. A hot tub 34 may be provided on the top deck 26. The hot tub 34 may be shaded by a frame supported awning 36. A pair of awnings 38 and 40 are situated at the bow end of the electric houseboat 10, with the awning 40 affording protection for the flying bridge 30. A pair of ventilation and exhaust stacks 42 extend upwardly from the top deck 26 on opposite sides of the electric houseboat 10. A cross beam may be extended between the ventilation and exhaust stacks 42, if desired.

Figure 2:
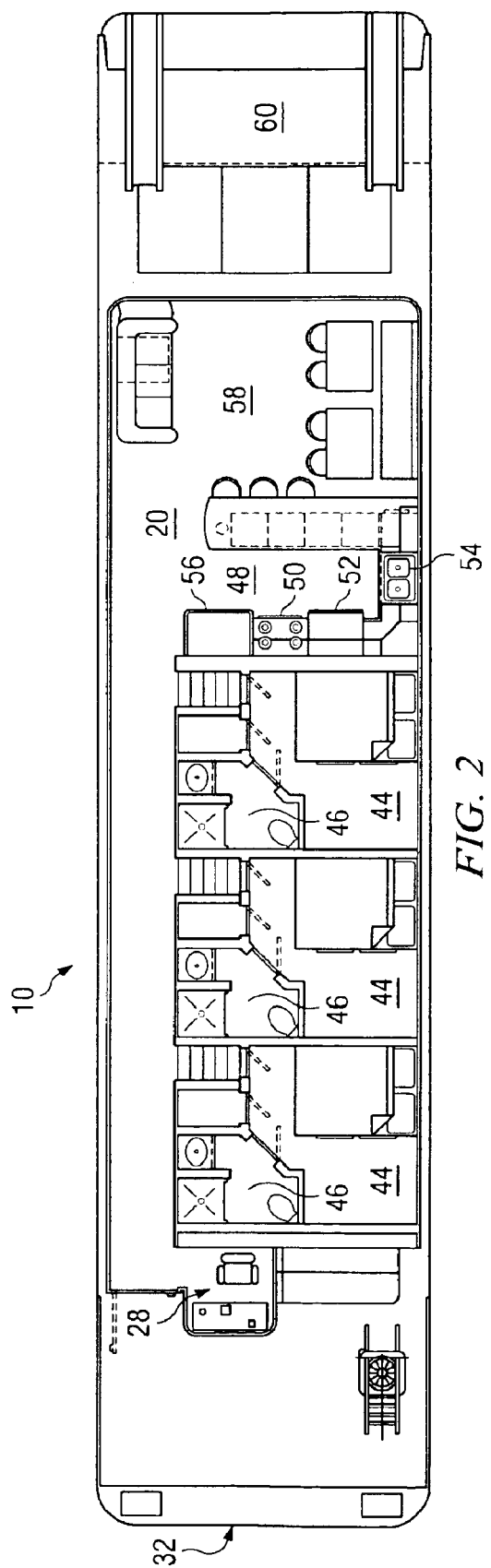
FIG. 2 is a plan view of the upper deck of the electric houseboat of FIG. 1.

Referring to FIG. 2, the upper deck 20 of the electric houseboat 10 is further illustrated. As previously indicated, the bridge 28 is located at the bow 32 of the electric houseboat 10. A plurality of bedrooms 44 are located aft of the bridge 28 and aligned with the windows 22. Each bedroom 44 is provided with a bathroom 46. In the embodiment of the invention illustrated in the drawings, the bathrooms 46 are accessible from within their associated bedrooms 44. Other configurations of the bedrooms 44 and the bathrooms 46 may also be utilized in the practice of the invention.

A kitchen 48 is located aft of the bedrooms 44 and is separate therefrom. The kitchen is aligned with the windows 22 which includes an electric stove/oven 50, a refrigerator freezer 52, and at least one sink 54. The kitchen 48 may further include an entertainment center 56. A seating area 58 is located aft of the kitchen 48 and also serves as a dining room for the electric houseboat 10. The extreme aft portion 60 of the upper deck 20 comprises an open area which facilitates recreational activities such as swimming, diving, and the like.

Figure 3:
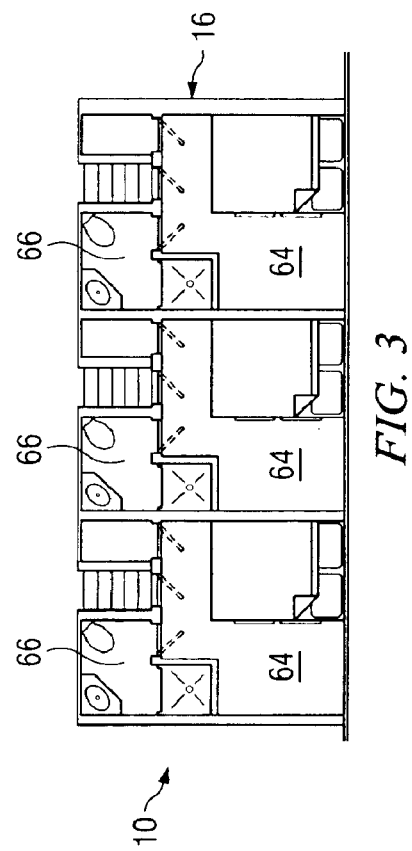
FIG. 3 is a plan view of the lower deck of the electric houseboat of FIG. 1.

FIG. 3 illustrates the lower deck 16 of the electric houseboat 10. The lower deck 16 comprises three bedrooms 64 each aligned with one of the windows 18. Each of the bedrooms 64 is provided with a bathroom 66. Each of the bathrooms 66 is accessible from within its associated bedroom 64. Other configurations of the bedrooms 64 and the bathrooms 66 may be utilized in the practice of the invention if desired.

Figure 4:
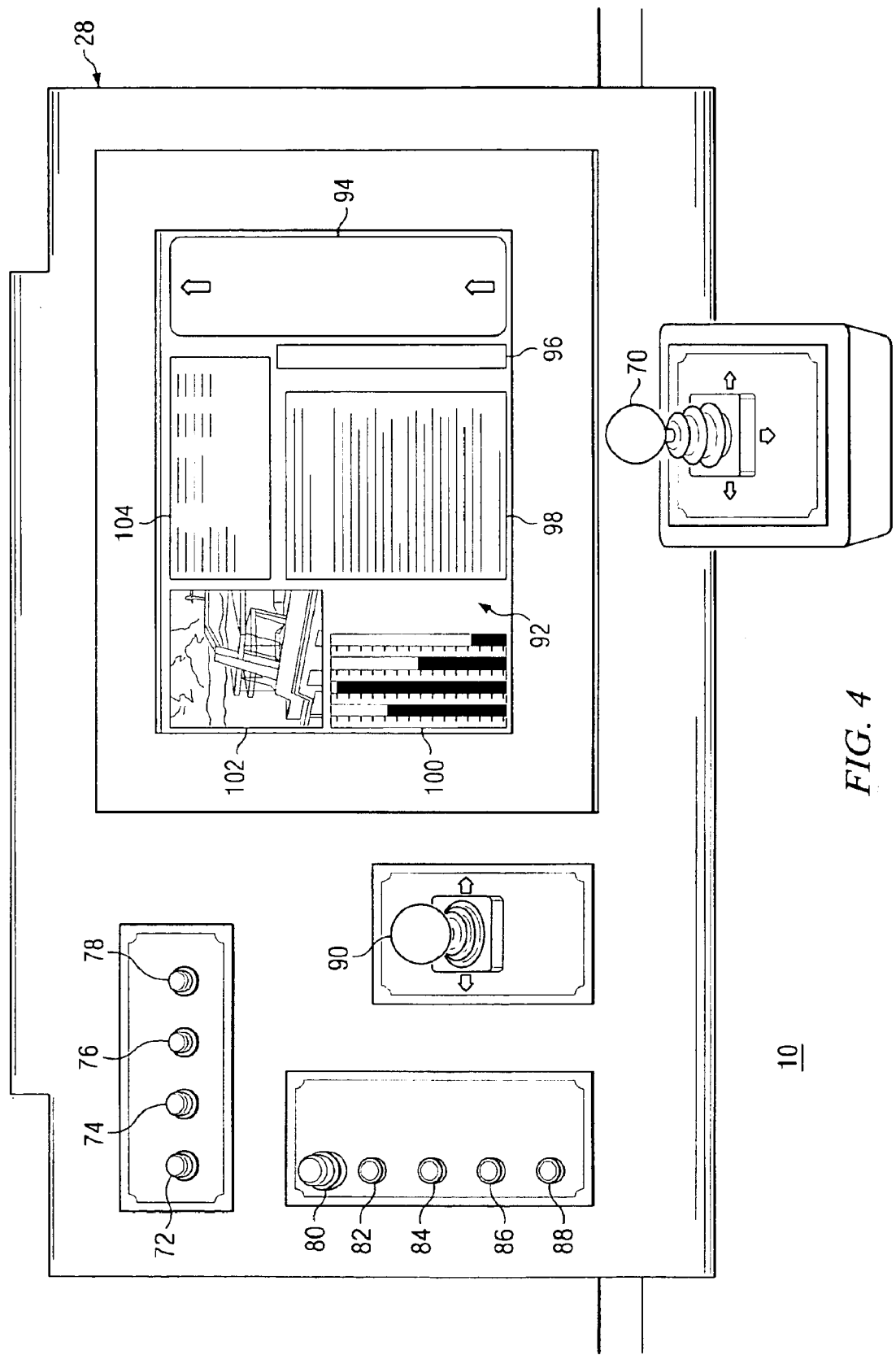
FIG. 4 is an illustration of the bridge of the electric houseboat of FIG. 1.

The interior of the bridge 28 of the electric houseboat 10 is illustrated in FIG. 4, it being understood that the flying bridge 30 of the electric houseboat 10 is substantially identical to the bridge 28. The speed and direction of movement of the electric houseboat 10 across the surface of a body of water is controlled by a joy stick 70. Forward movement of the joy stick 70 causes the electric houseboat 10 to move forwardly, that is, in the direction of the bow. Rearward movement of the joy stick 70 causes the electric houseboat 10 to move in reverse, that is, in the direction of the stern. Leftward movement of the joy stick 70 causes the electric houseboat 10 to turn to the left, while rightward movement of the joy stick 70 causes the electric houseboat 10 to turn to the right.

As will be appreciated by those skilled in the art, the extent to which the joy stick 70 is moved forwardly or rearwardly controls the speed at which the electric houseboat 10 moves forwardly or rearwardly, respectively. Likewise, the extent to which the joy stick 70 is moved leftwardly or rightwardly controls the severity at which the electric houseboat 10 turns to the left or turns to the right, respectively. Thus, if the joy stick 70 is simultaneously moved slightly forwardly and slightly to the left, the electric houseboat 10 will execute a gradual left turn, whereas if the joy stick 70 is simultaneously moved forwardly and leftwardly as far as possible, the electric houseboat 10 will execute a very abrupt and very rapid left turn.

The joy stick 70 is initially disabled. Enablement of the joy stick 70 begins with actuation of a push button 72. Actuation of the push button 72 in turns actuates a lamp 74 indicating that the joy stick enablement process is in progress. The joy stick 70 remains disabled during the enablement process.

At the conclusion of the joy stick enablement process, the lamp 74 is extinguished and a lamp 76 is illuminated indicating that the joy stick 70 has been enabled. The joy stick 70 may be disabled by actuating a "stop" push button 78. The joy stick 70 is automatically disabled if it not actuated for a three minute period.

The bridge 28 further comprises a plurality of switches. Switch 80 actuates the horn of the electric houseboat 10. Switch 82 actuates the navigation lights of the electric houseboat 10. Switch 84 actuates the anchor lights of the electric houseboat 10. Switch 86 controls the operation of the Diesel generator of the electric houseboat 10. Switch 88 is a spare which is not normally used in the operation of the electric houseboat 10.

The electric houseboat 10 is provided with a bow thruster which is utilized to position the bow of the electric houseboat 10 during docking operations. The bow thruster is operated by a joy stick 90. When the joy stick 90 is enabled, leftward movement of the joy stick 90 causes the bow of the electric houseboat 10 to move leftwardly and rightward movement of the joy stick 90 causes the bow of the electric houseboat 10 to move rightwardly.

The bridge 28 of the electric houseboat 10 also includes a display panel 92. Area 94 of the display panel 92 comprises a graphic representation of the electric houseboat 10 and includes an arrow indicating the direction of the electric houseboat 10 as it is being steered and an arrow indicating the positioning of the rudder. Area 96 of the display panel 92 comprises a thruster bar which indicates the operation of the propulsion motor 118 under the control of the joy stick 70. Area 98 of the display panel 92 comprises text instructions pertaining to the operation of the electric houseboat 10. Area 100 of the display panel 92 comprises gauges showing the fuel level, the water tank level, the battery level, the shower tank level, and the holding tank level of the electric houseboat 10. Area 102 of the display panel 92 comprises a camera view of the rear of the electric houseboat 10. Area 104 of the display panel 92 comprises indicator lights for accessories and other devices utilized on the electric houseboat 10.

Figure 5:
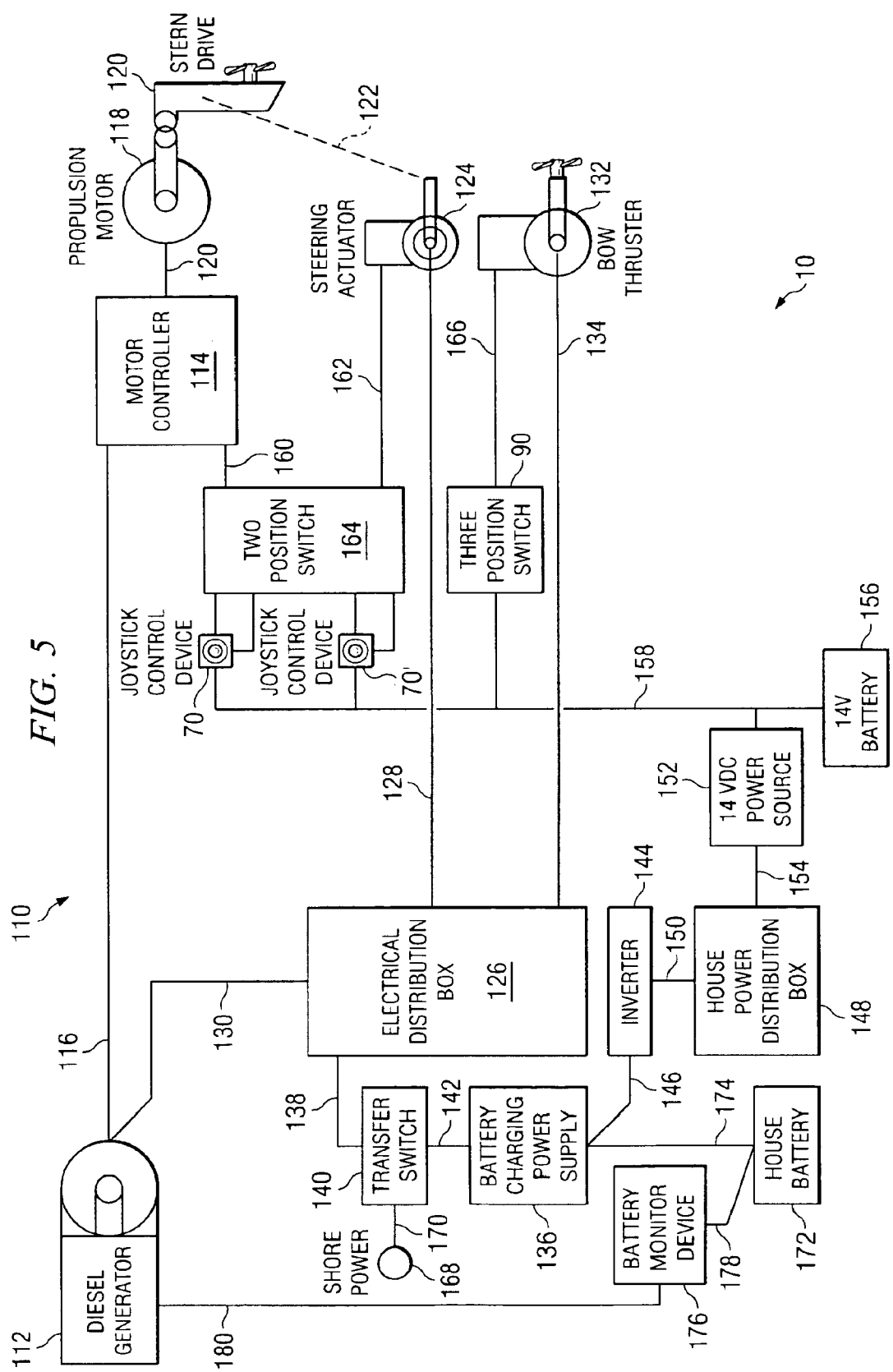
FIG. 5 is a schematic illustration of the electrical system of the electric houseboat of FIG. 1.

The electrical system 110 of the electric houseboat 10 is illustrated in FIG. 5. A Diesel generator 112 comprises the sole power source for the electric houseboat 10 when the electric houseboat is in operation. The Diesel generator 112 provides operating power to a motor controller 114 through a line 116. The motor controller 114 is in turn connected to a propulsion motor 118 by a line 119. The motor controller 114 controls both the speed of operation and the operational mode, i.e., forward or reverse, of the propulsion motor 118.

The Diesel generator 112 produces 3-phase AC power. The motor controller 114 converts the 3-phase AC power received from the Diesel generator 112 to DC voltage. The DC voltage is then converted back to 3-phase AC voltage with variable voltage and variable frequency. By simultaneously varying the frequency and the voltage comprised in the output from the motor controller, the operational speed of the propulsion motor 118 can be closely controlled. Two of the three phases comprising the output of the motor controller 114 are reversed to cause the propulsion motor 118 to operate in reverse.

The propulsion motor 118 is operatively connected to a stern drive unit 120. The function of the stern drive unit 120 is to propel the electric houseboat 10 across the surface of a body of water. As is indicated at 122, the stern drive unit 120 is operatively connected to a steering actuator 124 which may comprise a closed loop servo motor. The steering actuator 124 receives operating power from an electrical distribution box 126 through a line 128. The electrical distribution box 126 in turn receives operating power from the Diesel generator 112 through a line 130. The electrical distribution box 126 also supplies operating power to a bow thruster 132 through a line 134.

The electrical distribution box 126 also supplies operating power to a battery charging power supply 136 through a line 138, a transfer switch 140, and a line 142. The battery charging power supply 136 directs operating power 72 at 87 volt DC and up to 180 AMPS to an inverter 144 through a line 146. From the inverter 144, 120 volt AC operating power is directed to a house power distribution box 148 through a line 150. The house power distribution box 148 in turn supplies operating power to a 14 volt DC power source 152 through a line 154.

The 14 volt DC power source 152 and a 12 bolt battery 156 are both connected to a line 158 which extends to the joy stick 70 located in the bridge 28 and a corresponding joy stick 70' located in the flying bridge 30 of the electric houseboat 10. Control signals are directed to the motor controller 114 and to the steering actuator 124 through lines 160 and 162, respectively, from either the joy stick 70 or the joy stick 70' depending upon the positioning of a two position switch 164. The line 158 is also connected to the joy stick 90 which is operatively connected to the bow thruster 132 through a line 166.

A shore power receiving connector 168 is connected to the transfer switch 140 through a line 170. The transfer switch 140 connects shore power through the line 170 to the electrical distribution box 126 and to the battery charging power supply 136 when the electric houseboat 10 is in port and the Diesel generator 112 is not operating. The battery charging power supply directs charging power to a battery 172 through a line 174. The status of the battery 172 is continuously monitored by a battery monitoring device 176 which is connected to the battery 172 through a line 178. The battery monitoring device 176 is operatively connected to the Diesel generator through a line 180. Thus, whenever the charge of the battery 172 falls too low, the battery monitoring device functions to start the Diesel generator 112 whereby the battery 172 is recharged.

Figure 6:
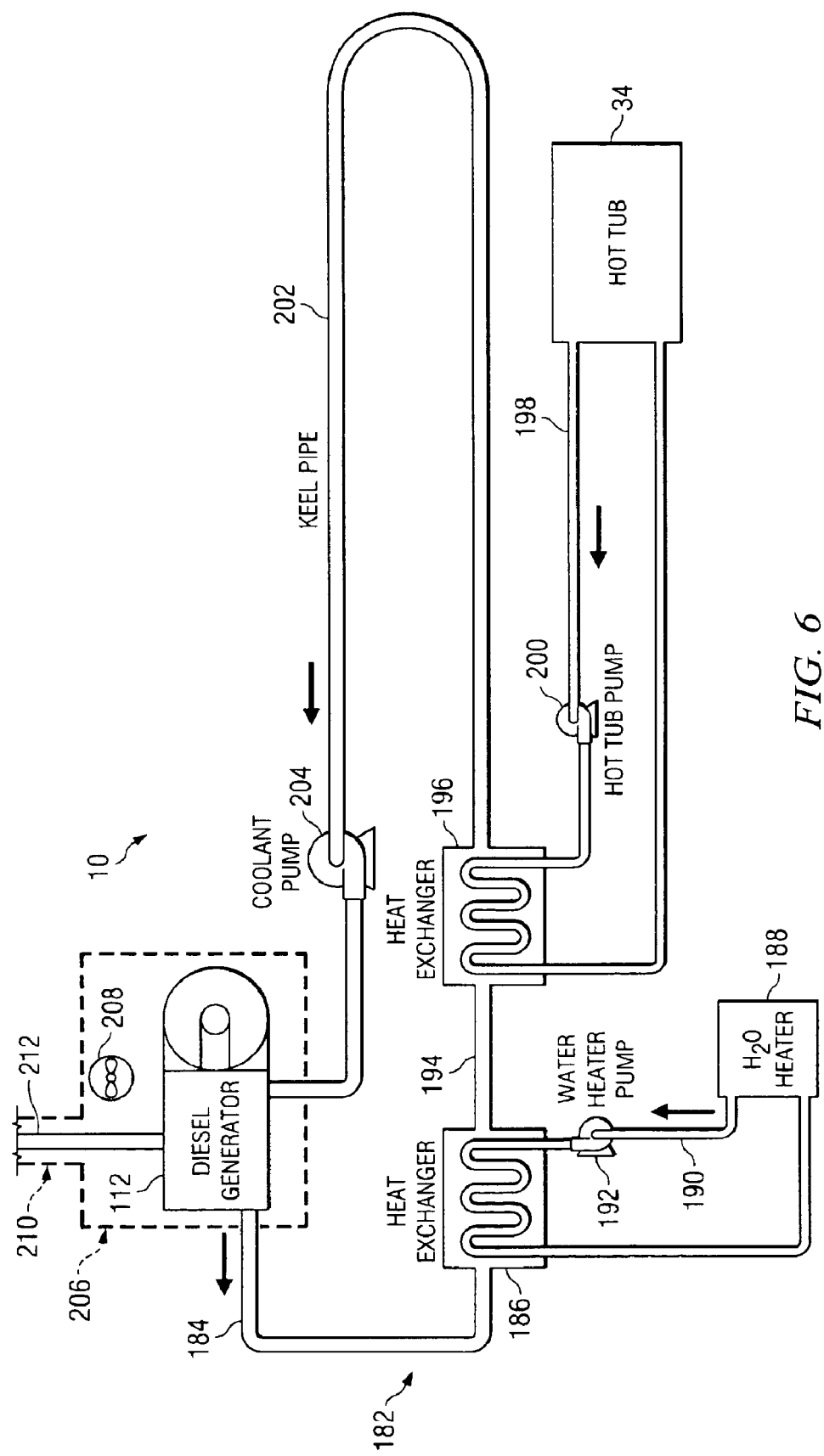
FIG. 6 is a schematic illustration of the Diesel generator temperature control system of the electric houseboat of FIG. 1.

Referring to FIG. 6, the electric houseboat 10 is provided with a temperature control system 182. As will be appreciated by those skilled in the art, coolant continuously circulates to the Diesel engine comprising the Diesel generator 112. Heated coolant is received from the Diesel generator 112 through a line 184 and is directed thereby to a heat exchanger 186. A water heater 188 supplies hot water to the bathrooms 46 and 66 and to the kitchen 48 of the electric houseboat 10. Water from the water heater 188 is directed by a line 190 through a water heater pump 192 and the heat exchanger 186 and is then returned to the water heater 188. The heat exchanger 186 functions to transfer heat from the coolant flowing through the line 184 to the water flowing through the line 190 thereby maintaining the water within the water heater 188 at the proper temperature.

From the heat exchanger 186 the coolant from the Diesel generator 112 flowing through the line 184 is directed through a line 194 to a heat exchanger 196. A line 198 directs water from the hot tub 34 through a hot tub pump 200 and the heat exchanger 196 prior to returning the water to the hot tub 34. In this manner the temperature of the water in the hot tub 34 is maintained at the desired temperature.

From the heat exchanger 196 coolant from the Diesel generator 112 is directed through a keel pipe 202. A coolant pump 204 is employed to continuously circulate coolant from the Diesel generator 112 through the line 184, through the heat exchanger 186, through the line 194, through the heat exchanger 196, through the keel pipe 202, and back to the Diesel generator 112. Referring to FIG. 1, the keel pipe 202 is secured to the bottom of the hull 12 of the electric houseboat 10 and extends substantially the entire length thereof. In this manner heat generated by operation of the Diesel generator 112 is transferred into the body of water over which the electric houseboat 10 operates.

The Diesel generator 112 is contained within a housing 206. A fan 208 circulates cooling air through the housing 206. The function of the fan 208 is to remove heat resulting from operation of the Diesel generator 112 thereby reducing the load on the air conditioner of the electric houseboat 10.

Air flowing through the housing 206 under the action of the fan 208 is directed upwardly through a passageway 210. An exhaust pipe 212 extending from the diesel engine under the Diesel generator 112 extends through the center of the passageway 210.

The passageway 210 extends to one or both of the ventilation and exhaust stacks 42. The exhaust pipe 212 extends upwardly through the passageway 210 and one of the two ventilation and exhaust stacks 42 whereby exhaust gases resulting from the operation of the Diesel generator 112 are discharged from the highest point of the electric houseboat 10. In this manner any possible contact between the exhaust gases and persons riding on or swimming around the electric houseboat 10 is completely eliminated.

As will be appreciated by those skilled in the art, the specifications for the various components comprising the electric houseboat of the present invention depend upon the requirements of particular applications of the invention. The following is a list of the major components useful in the construction of an 85 foot long, 18 foot wide, V-bottom hull houseboat comprising the present invention.

Diesel generator 112 is a John Deer 6 cylinder diesel engine model number 6067AFM and a 150 KW Marathon 3 phase 460 VAC generator.

Motor Controller 114 is a General Electric Af-300P11 model number 6KP1143100X1A1.

Propulsion Motor 118 is a General Electric S2102 100HP 3 phase 460 VAC motor NEMA frame 405T.

Stern Drive Unit 120 is an American Propulsion System model number 30-E-00-LL long shaft drive.

Steering Actuator 124 is an EXLAR model number SR21-1202-238.

Joysticks 70 and 70' are Maurey Instruments model JBE2304-2CK.

Bow Thruster 132 is a Vetus propulsion unit with a 10 HP GE 3 phase 460 VAC motor.

Battery Charging Power Supply 136 is two 90 AMP 90 VDC regulated power supplies Shaffer Electronics model number C5766V-U003.

The 14V power source—is a 12 volt automotive battery with a 40 AMP power supply that maintains 14 volts on the battery.

Inverter 144 is a 72 volt DC input and 230 VAC output Exeltech.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. An electric houseboat comprising:
a hull for flotation on and movement across a body of water, the hull having a length extending from bow to stern;
a house-like structure mounted on the hull for providing passenger accommodation and comprising at least one bedroom, at least one functional bathroom, and a functional kitchen, the house-like structure extending substantially along the entire length of the hull;
a Diesel generator mounted on the hull of the houseboat and comprising the sole power source on the houseboat for propulsion of the hull and operation of all onboard electrical appliances;
an electrically powered stern drive pivotally mounted on the houseboat stern and driven by electric power supplied by the Diesel generator for propelling the boat across the surface of the body of water;
an electric steering device mounted on the houseboat and driven by electric power supplied by the Diesel generator for controlling the direction of movement of the houseboat across the surface of the body of water;
wherein the primary use of the houseboat is to provide habitable space for accommodation of passengers.

2. An electric houseboat according to claim 1 wherein the hull comprises a flat bottom hull.

3. The electric houseboat according to claim 1 wherein the hull comprises a V-bottom hull.

4. The electric houseboat according to claim 1 wherein the hull comprises a pontoon-type hull.

5. The electric houseboat according to claim 1 wherein the house-like structure comprises a plurality of bedrooms each having a bathroom associated therewith, a separate kitchen, and a bridge comprising controls for the electric propulsion device and the electric steering device.

6. The electric houseboat according to claim 1 wherein the electric steering device comprises a closed loop servo motor operatively connected to the stern drive for positioning the stern drive relative to the hull of the houseboat thereby steering the houseboat.

7. The electric houseboat according to claim 1 wherein the electric steering device comprises a linear motor operatively connected to the stern drive for positioning the stern drive relative to the hull of the houseboat and thereby steering the houseboat.

8. An electric houseboat comprising:
a hull for flotation on and movement across a body of water, the hull having a length extending from bow to stern;
a house-like structure mounted on the hull for providing passenger accommodation and comprising at least one bedroom, at least one functional bathroom, and a functional kitchen, the house-like structure extending substantially along the entire length of the hull;
a Diesel generator mounted on the hull of the houseboat and comprising the sole power source on the houseboat for propulsion of the hull and operation of all onboard electrical appliances;
an electric propulsion device pivotally mounted on the houseboat stern and driven by electric power supplied by the Diesel generator for propelling the boat across the surface of the body of water;
an electric steering device mounted on the houseboat and driven by electric power supplied by the Diesel generator for controlling the direction of movement of the houseboat across the surface of the body of water;
means for discharging exhaust resulting from operation of the Diesel generator at a point substantially above the house-like structure comprising the houseboat;
wherein the primary use of the houseboat is to provide habitable space for accommodation of passengers.

9. An electric houseboat according to claim 8 wherein the hull comprises a flat bottom hull.

10. The electric houseboat according to claim 8 wherein the hull comprises a V-bottom hull.

11. The electric houseboat according to claim 8 wherein the hull comprises a pontoon-type hull.

12. The electric houseboat according to claim 8 wherein the house-like structure comprises a plurality of bedrooms each having a bathroom associated therewith, a separate kitchen, and a bridge comprising controls for the electric propulsion device and the electric steering device.

13. The electric houseboat according to claim 8 wherein the electric propulsion device comprises an electric motor and a stern drive driven by the electric motor.

14. The electric houseboat according to claim 13 wherein the electric steering device comprises a closed loop servo motor operatively connected to the stern drive for positioning the stern drive relative to the hull of the houseboat and thereby steering the houseboat.

15. The electric houseboat according to claim 13 wherein the electric steering device comprises a linear motor operatively connected to the stern drive for positioning the stern drive relative to the hull of the houseboat and thereby steering the houseboat.

16. The electric houseboat according to claim 8 further including:
means for directing a coolant through the Diesel generator to control the operating temperature thereof; and
a keel pipe secured to the hull of the houseboat in engagement with the body of water for receiving heated coolant from the Diesel generator and for discharging heat into the body of water.

17. The electric houseboat according to claim 16 for receiving heated coolant from the Diesel generator and for providing hot water for use in the bathroom and the kitchen of the houseboat.

18. The electric houseboat according to claim 16 further including a compartment mounted on the hull for enclosing the Diesel generator, and wherein the exhaust discharging means comprises a passageway extending from the Diesel generator receiving compartment upwardly to an exhaust opening situated a substantial distance vertically above the house-like structure.

19. An electric houseboat according to claim 18 further including an exhaust pipe extending from the Diesel generator upwardly through the exhaust passageway to the discharge port thereof.

20. An electric houseboat comprising:
a hull for flotation on and movement across a body of water, the hull having a length extending from bow to stern;
a house-like structure mounted on the hull for providing passenger accommodation and comprising at least one bedroom, at least one functional bathroom, and a functional kitchen, the house-like structure extending substantially along the entire length of the hull;
a Diesel generator mounted on the hull of the houseboat and comprising the sole power source on the houseboat for propulsion of the hull and operation of all onboard electrical appliances;
an electric propulsion device pivotally mounted on the houseboat stern and driven by electric power supplied by the Diesel generator for propelling the boat across the surface of the body of water;

an electric steering device mounted on the houseboat and driven by electric power supplied by the Diesel generator for controlling the direction of movement of the houseboat across the surface of the body of water;

means for directing a coolant through the Diesel generator to control the operating temperature thereof;

a keel pipe secured to the hull of the houseboat in engagement with the body of water for receiving heated coolant from the Diesel generator and for discharging heat into the body of water;

wherein the primary use of the houseboat is to provide habitable space for accommodation of passengers.

21. An electric houseboat according to claim 1 wherein the hull comprises a flat bottom hull.

22. The electric houseboat according to claim 1 wherein the hull comprises a V-bottom hull.

23. The electric houseboat according to claim 1 wherein the hull comprises a pontoon-type hull.

24. The electric houseboat according to claim 1 wherein the house-like structure comprises a plurality of bedrooms each having a bathroom associated therewith, a separate kitchen, and a bridge comprising controls for the electric propulsion device and the electric steering device.

25. The electric houseboat according to claim 1 wherein the electric propulsion device comprises an electric motor and a stern drive driven by the electric motor.

26. The electric houseboat according to claim 25 wherein the electric steering device comprises a closed loop servo motor operatively connected to the stern drive for positioning the stern drive relative to the hull of the houseboat thereby steering the houseboat.

27. The electric houseboat according to claim 25 wherein the electric steering device comprises a linear motor operatively connected to the stern drive for positioning the stern drive relative to the hull of the houseboat and thereby steering the houseboat.

* * * * *